United States Patent [19]

Park

[11] Patent Number: 4,979,801
[45] Date of Patent: Dec. 25, 1990

[54] REAR PROJECTION SCREEN HAVING A WIDE-RANGED EXTINGUISHING RATE FOR USE IN A TV RECEIVER

[75] Inventor: Hong C. Park, Seoul, Rep. of Korea

[73] Assignee: Goldstar Co., Ltd., Seoul, Rep. of Korea

[21] Appl. No.: 469,260

[22] Filed: Jan. 24, 1990

[30] Foreign Application Priority Data

Jan. 28, 1989 [KR] Rep. of Korea .................. 89-951

[51] Int. Cl.$^5$ .............................................. G03B 21/60
[52] U.S. Cl. .................................... 350/128; 350/126
[58] Field of Search ...................... 350/126, 127, 128

[56] References Cited

U.S. PATENT DOCUMENTS

| | | | |
|---|---|---|---|
| 4,636,035 | 1/1987 | Clausen et al. | 350/128 |
| 4,752,116 | 6/1988 | Sekiguchi | 350/128 |
| 4,859,027 | 8/1989 | Kishida | 350/128 |
| 4,921,329 | 5/1990 | Ito et al. | 350/128 |
| 4,923,280 | 5/1990 | Clausen et al. | 350/128 |
| 4,936,652 | 6/1990 | Clausen et al. | 350/128 |

FOREIGN PATENT DOCUMENTS 62-254134 11/1987 Japan .
63-163329 7/1988 Japan .

*Primary Examiner*—Richard A. Wintercorn
*Attorney, Agent, or Firm*—Birch, Stewart, Kolasch & Birch

[57] ABSTRACT

A rear projection screen having a wide-ranged extinguishing rate in which an area of portion for extinguishing the illumination light from exterior of the rear side of screen is widened so that the high contrast can be maintained, which includes a first sheet formed with Fresnel's lens and a second sheet having primary cylindrical lenticules at one side surface and secondary cylindrical lenticules at the other side surface, wherein a focus distance of the primary cylindrical lenticule is made to n/S1(n−1) and the focus distance thereof is set larger than the distance between the top point of the primary lenticule and the center point of the secondary lenticule whereby clear pictures on the screen can be obtained without lowering the contrast even under an illumination light from exterior.

3 Claims, 2 Drawing Sheets

REAR PROJECTION SCREEN HAVING A WIDE-RANGED EXTINGUISHING RATE FOR USE IN A TV RECEIVER

BACKGROUND OF THE INVENTION

1. Field of the Invention

The present invention relates to a projection screen of television receiver and more particularly, to a rear projection screen having a wide-ranged extinguishing rate which is made to maintain high contrast by widening the area of portions extinguishing the light illuminated on the rear side of screen.

2. Description of the Prior Art

In general, various types of rear projection screens having a wide-ranged extinguishing rate are well known in the art. One such rear projection screen is illustrated in FIGS. 1 and 2.

FIG. 1 is a cross-sectional view of a conventional rear projection screen with a sectionally enlarged view thereof. As shown in the drawing, a Fresnel's lens 1 is formed on the lens side, and lenticules 2 are formed at the television viewer's side. The Fresnel's lens 1 is in the form of concentric circles when viewed from the lens side, and is formed with Fresnel's lens facets 3 having saw teeth cross section. The lenticules 2 are a vertical lines repeated in a horizontal direction when viewed from the viewer's side. The cross section is formed with lenticular facets 4 made of a particular geometrical structure. Diffusers 13 are particles distributed in random within the screen, the refractive index of which particles is different from that of the substrate. On the other hand, extinguishing portions 5 covered a blackener coating layer are formed between each lenticular facet 4.

According to such conventional rear projection screen as shown in FIG. 2, lights of the entire field of Braun tube 6 are emitted through a projection lens 7 and the emitted lights are converted to parallel lights of homogeneous diffusion characteristics through the Fresnel's lens of a screen 8. Then, these lights are diffused vertically and horizontally through the diffusers 13 and horizontally through the lenticule 2.

These diffused lights are sensed by the eyes 9 of the viewer.

The exterior illumination light (noise light) which is an obstructing factor of the contrast being incident from the viewer's side is extinguished by extinguishing portions 5. The contrast depends on where the areas of the lenticular facets 4 and the extinguishing portions 5 are respectively a and b, the ratio of a:b.

In the conventional rear projection screen, since the area b of the extinction portions 5 is relatively smaller than the area of the lenticular facets 4, there has been a defect that the contrast becomes lower under the exterior illumination light.

SUMMARY OF THE INVENTION

Accordingly, it is an object of the present invention to provide an rear projection screen having a wide-ranged extinguishing rate in which the area of extinguishing portions with respect to that of lenticular facets is increased and the contrast is raised so that a clear picture can be obtained even under an exterior illumination light (noise light).

Another object of the present invention as above is to provide a rear projection screen which includes a first sheet formed with a Fresnel's lens on the opposite side of a projection lens and a second sheet in which primary cylindrical lenticules and secondary cylindrical lenticules both having circular arc shaped cross sections are arranged repeatedly on each surface thereof in a horizontal direction, diffusers are mixed within the substance between the primary and secondary cylindrical lenticules, and extinguishing portions are arranged repeatedly among the secondary cylindrical lenticules and disposed on the opposite side of the Fresnel's lens of the first sheet.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a rear projection screen having a wide-ranged extinguishing rate in which an area of portion for extinguishing the illumination light from exterior of the rear side of screen is widened so that the high contrast can be maintained, which includes a first sheet formed with Fresnel's lens and a second sheet having primary cylindrical lenticules at one side surface and secondary cylindrical lenticules at the other side surface, wherein a focus distance of the primary cylindrical lenticule is made to $n/S1(n-1)$ and the focus distance thereof is set larger than the distance between the top point of the primary lenticule and the center point of the secondary lenticule whereby clear pictures on the screen can be obtained without lowering the contrast even under an illumination light from exterior.

BRIEF DESCRIPTION OF THE DRAWINGS

The present invention will become more fully understood form the detailed description given hereinbelow and the accompanying drawings which are given by way of illustration only, and thus are not limitative of the present invention, and wherein.

DESCRIPTION OF THE PREFERRED EMBODIMENTS

Figure 1:
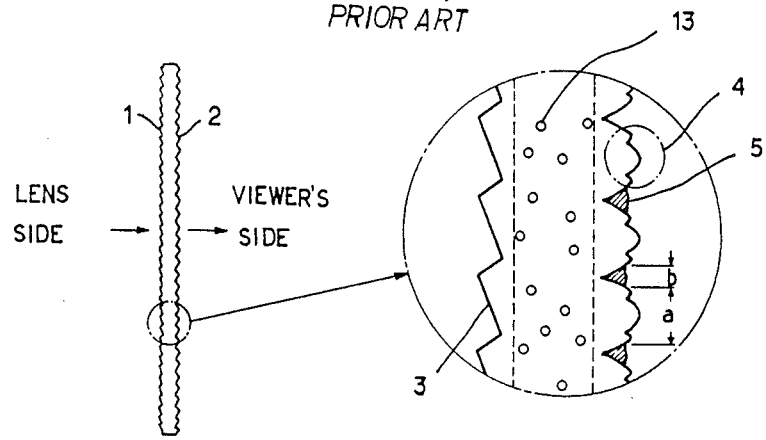
FIG. 1 is a cross-sectional view of a conventional rear projection screen with a sectionally enlarged view thereof.
Figure 2:
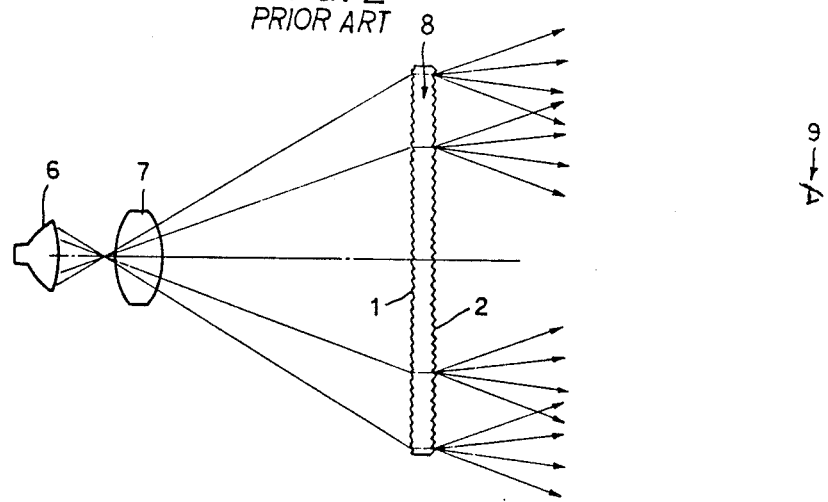
FIG. 2 is an explanatory illustrating the operation of the conventional rear projection screen.
Figure 3:
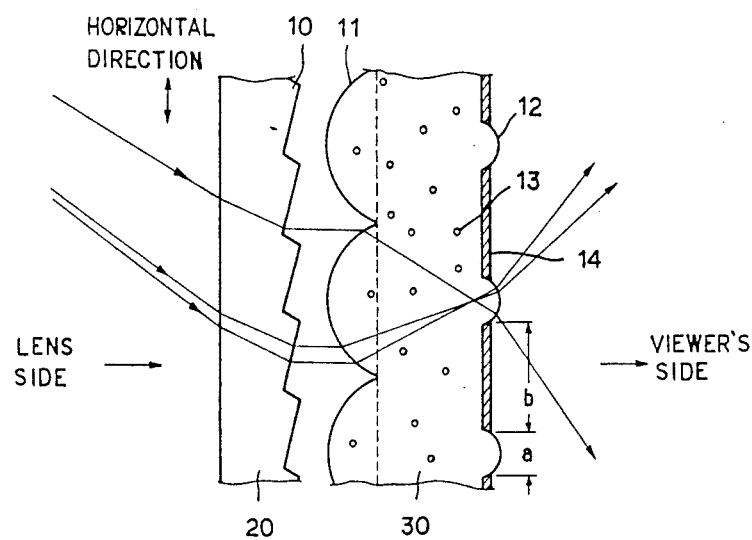
FIG. 3 is a cross-sectional view of a rear projection screen of the present invention.
Figure 4:
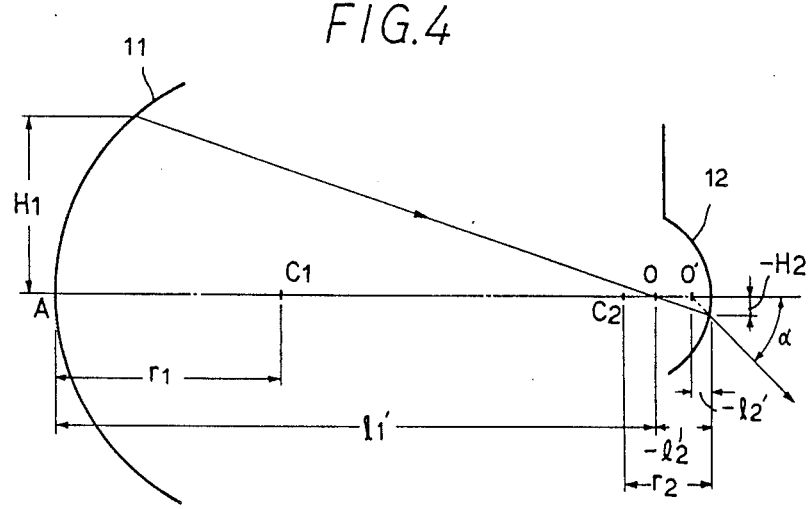
FIG. 4 is an explanatory illustrating the operation of the rear projection screen of the present invention.

Referring now in detail to the drawings for the purpose of illustrating preferred embodiments of the present invention, the rear projection screen having a wide-ranged extinguishing rate for use in a TV receiver as shown in FIGS. 3 and 4 includes a first sheet 20 disposed on the side of the projection lens and a second sheet 30 disposed on the viewer's side. A Fresnel's lens 10 is formed on the side surface of the first sheet 20 opposite to the projection lens. Primary cylindrical lenticules 11 and secondary cylindrical lenticules 12 both having circular arc shaped cross sections are respectively, repeatedly arranged in the horizontal direction on each side surface of the second sheet 30. Diffusers 13 are mixed within the substance of the second sheet 30 and extinguishing portions 14 are repeatedly arranged among the secondary cylindrical lenticules 12 on the viewer's side surface of the second sheet 30. The primary cylindrical lenticules 11 face the Fresnel's lens 10 and the secondary cylindrical lenticule 12 is arranged to face the viewer's side.

As shown in FIG. 4, a parallel light passing through the Fresnel's lens 10 of the first sheet 20 is focused on the secondary cylindrical lenticule 12 through the primary cylindrical lenticule 11, and diffused on the screen, wherein:

A and B are the top points of the primary and secondary lenticules 11 and 12, respectively, H1 and H2 are the heights of the parallel light of the primary and secondary lenticules 11 and 12, respectively, C1 and C2 are the center points of circular arcs of the primary and secondary lenticules 11 and 12, respectively, r1 and r2 are radii of curvature of the primary and secondary lenticules 11 and 12, respectively, l1′, l2 and l2′ are the focus distances of the primary and secondary lenticules 11 and 12, respectively, and O represents the focus of the primary cylindrical lenticule 11. The radii of curvatures r1 and 42 are constituted with the relation of r1>r2.

According to the present invention, the rear projection screen operates as follows:

The rays of light of the entire field emitted from the projection lens pass through the Fresnel's lens 10 of the first sheet 20 and become to parallel rays of light and these parallel rays of light are directed to the primary cylindrical lenticules 11 of second sheet 30, and then pass through the diffusers 13 and are focused on the proximity of the focus points O. At this moment, the focus distance l1′ becomes as following equation (I):

$$l1' = \frac{n}{S1(n-1)} \quad (I)$$

Wherein n is the refractive index of the screen substance, S1 is a curvature of the primary cylindrical lenticules 11, wherein the curvature (S1) is 1/r1, i.e., the reciprocal of curvature r1.

On the other hand, in the above description, although all rays of light are not correctly focused on the focuses O of the primary cylindrical lenticules 11 due to a spherical aberration, all rays of light make no problem for the diffusing function since most of them are focused on the proximity of the focus O.

The thickness of the screen and the center points C1 and C2 of the primary and secondary cylindrical lenticules 11 and 12 are determined so that the focus points O are to be located at the rear side of the center points C2 of the secondary cylindrical lenticules 12, i.e., at the location between the center points C2 and the top points B of secondary cylindrical lenticules 12.

Thus, the rays of light emitted again from the focus point O are refracted by the secondary cylindrical lenticule 12. Therefore, they lock as if emitted from the point O' on the light axis line.

At this moment, when the height of the parallel rays of light meeting at a predetermined point of the primary cylindrical lenticule 11 is H1, the final direction of the light forms the angle of with respect to the light axis and this diffusing angle α can be expressed as the following equation (II):

$$\alpha = \tan^{-1}\left\{ s1(n-1)l2H1\left[1 + C2\left(\frac{1}{n} - 1\right)l2\right]\right\} \quad (II)$$

Wherein l2 is the distance $\overline{OB}$ and S2 is the curvature of the secondary cylindrical lenticule 12, i.e., the reciprocal of the radius of curvature r2.

On the other hand, since the diffusing angle α is a factor for determining the view angle, the curvature S2 of the secondary cylindrical lenticule 12 is preferably large with respect to the desired light so that b/a which is the ratio of the extinction portion. The secondary cylindrical lenticule 12 becomes larger.

Thus, according to b/a becoming larger, even when the illumination light (noise light) is directed from exterior, the illumination light is sufficiently extinguished by the extinction portions 14. Therefore high contrast can be maintained.

As described above in detail, since the present invention increases the extinguishing rate of exterior illumination light by utilizing two sheets and lenticules, the clear pictures can be obtained without the contrast being lower even under an illumination light from exterior.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A rear projection screen having a wide-ranged extinguishing rate comprising:
   a first sheet formed with a Fresnel's lens, and
   a second sheet 30 including primary cylindrical lenticules of a small curvature repeatedly arranged in the horizontal direction toward said first sheet, secondary cylindrical lenticules of a large curvature and extinguishing portions 14 are repeatedly arranged toward viewer's side, and diffusers 13 mixed in the substance between said primary and secondary cylindrical lenticules.

2. The rear projection screen of claim 1, wherein said Fresnel's lens 10 of said first sheet 20 is formed so as to face toward said second sheet 30.

3. The rear projection screen of claim 1, wherein a focus distance of said primary cylindrical lenticule of said second sheet 30 is made to n/S1(n−1) (n is the refraction index of the screen substance and S1 is a curvature of the primary cylindrical lenticules) and said focus distance is set larger than a distance between the top point of said primary cylindrical lenticule and the center point of said secondary cylindrical lenticule.

* * * * *